United States Patent [19]

Davis et al.

[11] 4,382,821

[45] May 10, 1983

[54] FILLING MATERIALS FOR COMMUNICATIONS CABLE

[75] Inventors: Lawrence E. Davis; Naren I. Patel, both of Hickory, N.C.

[73] Assignee: Siecor Corporation, Hickory, N.C.

[21] Appl. No.: 317,483

[22] Filed: Nov. 2, 1981

Related U.S. Application Data

[60] Division of Ser. No. 146,339, May 2, 1980, Pat. No. 4,333,706, which is a continuation-in-part of Ser. No. 106,866, Dec. 26, 1979, abandoned.

[51] Int. Cl.$^3$ .................. C08K 3/40; C08L 21/06; C08L 91/06
[52] U.S. Cl. .................. 106/272; 106/285; 523/173; 523/218; 523/219
[58] Field of Search .................. 523/173, 219, 218; 106/231, 285, 272

[56] References Cited

U.S. PATENT DOCUMENTS

| | | | |
|---|---|---|---|
| 3,843,568 | 10/1974 | Woodland et al. | 523/173 |
| 3,864,431 | 2/1975 | Reid | 523/173 |
| 3,893,961 | 7/1975 | Walton et al. | 523/173 |
| 3,893,962 | 7/1975 | Walton et al. | 523/173 |
| 4,105,619 | 8/1978 | Kaufman et al. | 523/173 |

FOREIGN PATENT DOCUMENTS

| | | | |
|---|---|---|---|
| 715193 | 9/1954 | United Kingdom | 523/173 |

*Primary Examiner*—Allan Lieberman
*Attorney, Agent, or Firm*—Roy B. Moffitt

[57] ABSTRACT

Disclosed are telephone cable filling materials and telephone cables comprised of a plurality of insulated electrical conductors twisted together to form a core in which there are a multiplicity of interstices between the insulated electrical conductors filled with the cable filler materials. The filling materials are composed of a petrolatum base material and inorganic microspheres and can be divided into two groups: (1) a first group to fill cables used at temperatures below the melting point of the petrolatum and (2) a second group to fill cables that may be used above that temperature. The first group is composed of mixtures of 40 to 90 weight percent petrolatum and 1 to 60 weight percent inorganic hollow (air filled) microspheres. When mixtures from this group are used as a filler in a telephone cable, the filler has a drip point nearly equal to the average melting point of the petrolatum, normally 57.2° C. The second group is composed of two embodiments. The first embodiment comprises 62 to 95 weight percent petrolatum, 1 to 35 weight percent inorganic hollow microspheres, and 1 to 8 weight percent low molecular weight polyethylene dissolved in the petrolatum. The second embodiment comprises 60 to 98 weight percent petrolatum, 1 to 39 weight percent inorganic hollow microspheres and 1 to 15 weight percent of glycerol hydroxy stearate dissolved in the petrolatum. When mixtures from the second group are used as a filler in a telephone cable, drip points ranging from the average melting point of petrolatum to temperatures in excess of 75° C. are observed.

4 Claims, 5 Drawing Figures

U.S. Patent  May 10, 1983  4,382,821
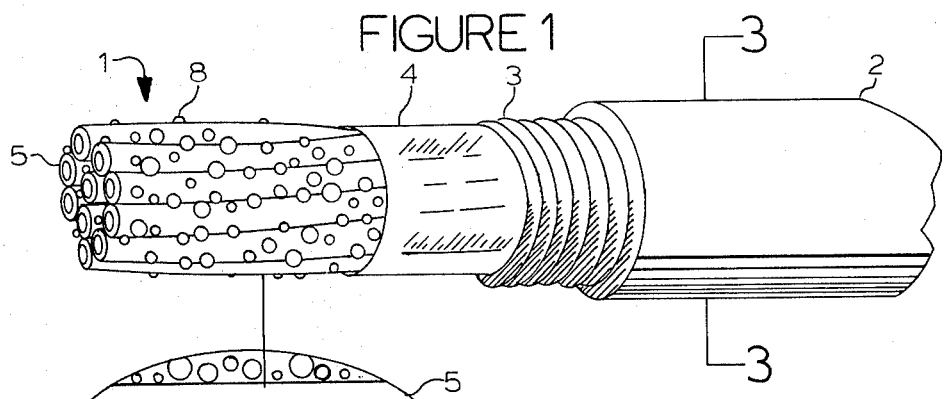
FIGURE 1
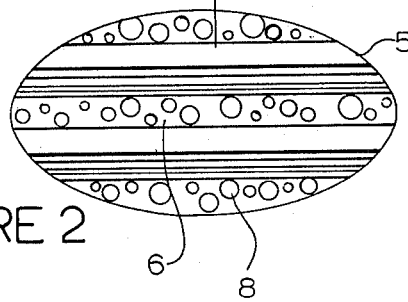
FIGURE 2
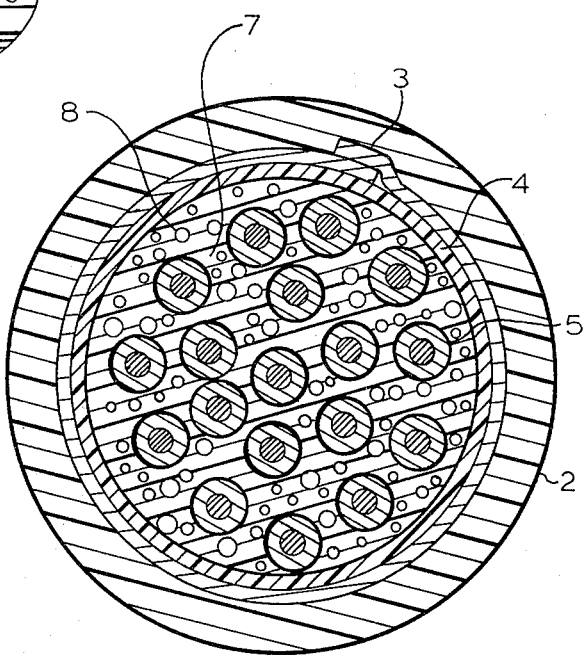
FIGURE 3
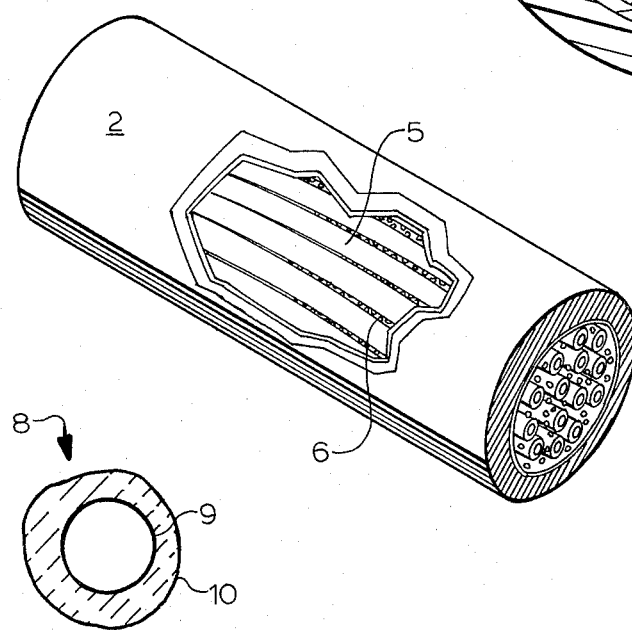
FIGURE 4
FIGURE 5

FILLING MATERIALS FOR COMMUNICATIONS CABLE

CROSS REFERENCE TO RELATED APPLICATIONS

This is a division, of application Ser. No. 06/146,339 filed May 2, 1980 which is now U.S. Pat. No. 4,333,706, and which is a continuation-in-part of an application entitled "Filling Compound for Telephone Cable," filed Dec. 26, 1979, Ser. No. 106,866, now abandoned.

BACKGROUND OF THE INVENTION

The instant invention relates to two groups of filling materials that find application when used in the manufacture of filled electrical and optical waveguide communications cables.

One group of materials contemplated by this invention is a mixture of organic material and inorganic hollow microspheres having a melting or drip point nearly equal to the melting point of petrolatum, i.e. an average value of 57.2° C. The other group of materials of this invention is composed of a mixture of organic materials and inorganic hollow microspheres having drip points ranging from the drip point of petrolatum per se to 75° C. In this group, the organic material is a modified petrolatum, containing dissolved polyethylene or glycerol hydroxy stearate.

Another aspect of this invention relates to cable filling materials which have desirable dielectric constants and are adapted to occupy the interstices between and around insulated electrical conductors, generally twisted in pairs, forming a bundle or core of a cable.

Another important aspect of this invention relates to communications cables filled with materials, in which entry and migration of moisture within the cable is substantially restricted.

Additional aspects of the instant invention relate to cable filling materials which have reduced shrinkage when cooled and lower dielectric constants and densities than those of petrolatum per se.

Still another aspect of this invention relates to filling materials that can be mixed at approximately 240° F. and used to fill interstices within the communications cables at temperatures ranging from 190° to 220° F. during their manufacture.

DESCRIPTION OF THE PRIOR ART

In the art of designing and constructing electrical communications cables, such as telephone cables, it is accepted practice to assemble insulated conductors in a core surrounded by a core wrap (or a helically wound or longitudinally applied heat barrier wrap), a metallic shield and finally a polymeric jacket to complete the cable construction. Moisture or water may enter such cables by diffusion pumping through the jacket or migration through open cable ends, leaky splices or flooded terminals or through manufacturing defects or openings in the protective jacket resulting from mechanical damage or rodent attack.

Once water enters the cable core, it is free to migrate and accumulate in interstices along the length of the cable. Presence of water within a cable has catastrophic effects on electrical properties because it increases mutual capacitance of the pairs and thus increases transmission loss. Corrosive effects of water on metal components may result in an electrical open circuit and presence of moisture in optical waveguide cables has deleterious effects on light transmission properties. To solve these problems, the prior art teaches the filling of interstices within the core of a cable and elsewhere within the cable with grease-like compositions to prevent or minimize the entry and migration of water. Unfilled or partially filled areas left in the so-called "filled cables," during or after filling operation, provide sites where water can enter and accumulate and are, therefore, undesirable.

The state of the prior art relevant to the instant invention is best described by U.S. Pat. Nos. 3,706,838; 3,683,104; 3,843,568; 3,801,359; 3,888,710; 3,893,961 and 4,110,554.

U.S. Pat. No. 3,706,838, issued in 1972, disclosed petrolatum per se as a filling compound. Petrolatum-filled communications cables have many shortcomings, not the least of which is the property of petrolatum to become fluid at elevated temperatures to which the cables may be subjected during installations or in use, particularly in warm climates. In the fluid state, it may flow out of the cable through openings or settle from relatively higher portions of the cable into lower portions, thus leaving partially filled spaces that result in electrical imbalance in the system. Petrolatum has a dielectric constant of 2.25 at $10^5$ and $10^6$ Hertz; air has a dielectric constant of 1.0. Use of petrolatum as a filler to fill the space otherwise occupied by air increases mutual capacitance of the pairs of electrical conductors. Additionally, petrolatum has a tendency to shrink on cooling, thus leaving unfilled spaces and it has a propensity to deteriorate some of the insulating materials widely used in communications cable construction. The instant invention is directed to solving these and other shortcomings of petrolatum per se as a filling compound.

U.S. Pat. No. 3,683,104, issued in 1972, and U.S. Pat. No. 3,843,468, issued in 1974, disclosed heat-resistant mixtures of petrolatum and partially cross-linked polymers to which hollow synthetic thermoplastic particles prepared from a copolymer of styrene and acrylonitrile were added. U.S. Pat. No. 3,801,359, issued in 1974, disclosed a method of filling communications cables with a mixture of 85 percent petrolatum with 15 percent low molecular weight polyethylene to prevent dripping at temperatures of 80° C. and below. U.S. Pat. No. 3,888,710, issued in 1975, disclosed a method to render blends of low density polyethylenes having major proportions of low molecular weight and minor proportions of high molecular weight polyethylenes into grease-like materials useful in filling electrical cables by cold-filling processes. U.S. Pat. No. 3,893,961, issued in 1975, disclosed compositions suitable for filling splice closures in telecommunications cables comprising 85 to 98 weight percent polybutene, 0.25 to 6 weight percent of a gelling agent selected from a group consisting of hydrogenated castor oil and finely divided silica, and 1 to 10 weight percent polyethylene having a molecular weight in the range of about 10,000 to about 20,000. Finally, U.S. Pat. No. 4,110,554, issued in 1978, disclosed a construction of flexible, high load, electrically conductive buoyant tether cable in which interstices within the central stress bearing elements remained hollow for buoyancy while all other interstices within the tether cable were substantially filled with thin walled, hollow glass microspheres. These microspheres increased the buoyancy of the cable and tended to prevent collapse of the cable from water pressure when used in deep water operations.

SUMMARY OF THE INVENTION

The instant invention relates to two groups of filling compositions that find application in the manufacture of filled electrical and optical waveguide communications cables. The first group is composed of mixtures of petrolatum (also referred to as petroleum jelly) and inorganic hollow (air filled) microspheres. These mixtures have drip points nearly equal to the average melting point of the petrolatum component, average value 57.2° C. The second group is composed of mixtures of modified petrolatum and inorganic hollow (air filled) microspheres. These mixtures have drip points ranging from 57.2° C. to 75° C. and above. The modified petrolatum comprises petrolatum thoroughly blended with either polyethylene (first embodiment) or glycerol hydroxy stearate (second embodiment).

To facilitate an understanding of the invention, several examples of the cable filling compositions and their relevant properties are herein presented in tabular form. Data for the first group filling materials are listed in Table I. Data for the second group are listed in Tables II and III. Table II contains data relating to petrolatum modified with low molecular weight polyethylene. Table III contains data relating to petrolatum modified with glycerol hydroxy stearate. Data in Tables I through III on oil separation or drip from the conductors were obtained as follows:

An end portion of the polymeric jacket (and the metallic shield) of an air core cable were removed exposing approximately a three-inch length of the insulated electrical conductors. The conductors were then separated from one another and dipped into the molten formulation to be tested, allowed to cool, and then hung vertically in ovens maintained at preselected temperatures for 24 hours, during which time they were observed for any oil separation or drip.

TABLE I

| Example | Petrolatum Containing 0.2% Irganox 1010 | Inorganic Hollow Microspheres | First Group Properties No Oil Separation or Drip from Conductors After 24 Hours at: | Theoretical Composite Density at Room Temp. - gm/cm$^3$ | Dielectric Constant at 1 kHz |
|---|---|---|---|---|---|
| 1 | 99% | 1% (glass type, particle density 0.15 gms/cm$^3$) | 55° C. | 0.84 | 2.20 |
| 2 | 95% | 5% (glass type, particle density 0.15 gms/cm$^3$) | 55° C. | 0.71 | 1.82 |
| 3 | 80% | 20% (glass type, particle density 0.15 gms/cm$^3$) | 60° C. | 0.45 | 1.59 |
| 4 | 80% | 20% (glass type, particle density 0.16 gms/cm$^3$) | 60° C. | 0.46 | |
| 5 | 80% | 20% (glass type, particle density 0.25 gms/cm$^3$) | 60° C. | 0.59 | 2.14 |
| 6 | 65% | 35% (ceramic type, particle density 0.6 gms/cm$^3$) | 60% | 0.76 | 1.96 |
| 7 | 40% | 60% (ceramic type, particle density 0.6 gms/cm$^3$) | Too thick & dry for this test. | 0.69 | 2.02 |

TABLE II

| | | | Second Group Properties - First Embodiment (Petrolatum Modified with Polyethylene) | | | |
|---|---|---|---|---|---|---|
| Example | Petrolatum Containing 0.2% Irganox 1010 | Inorganic Hollow Microspheres | LMW Polyethylene Dissolved in Petrolatum | No Oil Separation or Drip from Conductors After 24 Hours at: | Theoretical Composite Density at Room Temp. - gm/cm$^3$ | Dielectric Constant at 1 kHz |
| 8 | 95% | 1% (glass type, particle density 0.15 gms/cm$^3$) | 4% | 60° C. | 0.84 | 2.28 |
| 9 | 91% | 5% (glass type, particle density 0.15 gms/cm$^3$) | 4% | 65° C. | 0.71 | 1.83 |
| 10 | 84% | 15% (glass type, particle density 0.15 gms/cm$^3$) | 1% | 65° C. | 0.51 | 1.60 |
| 11 | 79% | 20% (glass type, particle density 0.15 gms/cm$^3$) | 1% | 65° C. | 0.45 | 1.57 |
| 12 | 72% | 20% (glass | 8% | 73° C. | 0.45 | 1.54 |

TABLE II-continued

Second Group Properties - First Embodiment (Petrolatum Modified with Polyethylene)

| Example | Petrolatum Containing 0.2% Irganox 1010 | Inorganic Hollow Microspheres | LMW Polyethylene Dissolved in Petrolatum | No Oil Separation or Drip from Conductors After 24 Hours at: | Theoretical Composite Density at Room Temp. - gm/cm³ | Dielectric Constant at 1 kHz |
|---|---|---|---|---|---|---|
| 13 | 91% | 1% (glass type, particle density 0.15 gms/cm³) | 8% | 71° C. | 0.84 | 2.30 |
| 14 | 82% | 15% (glass type, particle density 0.15 gms/cm³) | 3% | 71° C. | 0.51 | 1.58 |
| 15 | 72% | 24% (glass type, particle density 0.22 gms/cm³) | 4% | 71° C. | 0.51 | 1.73 |
| 16 | 62% | 35% (ceramic type, particle density 0.6 gms/cm³) | 3% | 75° C. | 0.77 | 2.07 |

TABLE III

Second Group Properties - Second Embodiment (Petrolatum Modified with Glycerol Hydroxy Stearate)

| Example | Petrolatum Containing 0.2% Irganox 1010 | Inorganic Hollow Microspheres | Glycerol Hydroxy Stearate Dissolved in Petrolatum | No Oil Separation or Drip from Conductors After 24 Hours at: | Theoretical Composite Density at Room Temp.-gm/cm³ | Dielectric Constant at 1 kHz |
|---|---|---|---|---|---|---|
| 17 | 98% | 1% (glass type, particle density 0.15 gms/cm³) | 1% | 55° C. | 0.84 | 2.03 |
| 18 | 93% | 5% (glass type, particle density 0.15 gms/cm³) | 2% | 60° C. | 0.71 | 1.95 |
| 19 | 76% | 23% (glass type, particle density 0.15 gms/cm³) | 1% | Too thick & dry for this test | 0.42 | 1.47 |
| 20 | 65% | 25% (glass type, particle density 0.15 gms/cm³) | 10% | Too thick & dry for this test | 0.40 | 1.56 |
| 21 | 66% | 19% (glass type, particle density 0.15 gms/cm³) | 15% | 75° C. | 0.46 | 1.92 |
| 22 | 75% | 10% (glass type, particle density 0.15 gms/cm³) | 15% | 75° C. | 0.59 | 2.23 |
| 23 | 82% | 16% (glass type, particle density 0.15 gms/cm³) | 2% | 75° C. | 0.49 | 1.60 |
| 24 | 77% | 20% (glass type, particle density 0.15 gms/cm³) | 3% | 75° C. | 0.45 | 1.65 |
| 25 | 72% | 23% (glass type, particle density 0.15 gms/cm³) | 5% | Too thick & dry for this test | 0.42 | 1.55 |
| 26 | 65% | 25% (glass type, particle density 0.22 gms/cm³) | 10% | 75° C. | 0.50 | 1.89 |
| 27 | 60% | 39% (ceramic type, particle density 0.6 gms/cm³) | 1% | 75° C. | 0.74 | 2.19 |

The term petrolatum, as used in this disclosure, means a mixture of microcrystalline waxes and oil. Preferably, the amount of oil in the petrolatum used with the instant invention is no more than 15 percent as determined by ASTM D-721. Such a material can be procured from Penreco Inc. of Butler, Pa. However, all so-called cable grade petrolatums are deemed to be operable.

A typical petrolatum used had a nominal melting point of 57.2° C., density of 0.88 grams/cm$^3$ at room temperature, oil content of no more than 15 weight percent, dielectric constant of 2.25 maximum at $10^5$ to $10^6$ Hertz and dissipation factor of 0.0004 maximum at $10^5$ Hertz and 0.0008 maximum at $10^6$ Hertz. It also contained a small amount of an antioxidant additive, namely 0.2 percent by weight Irganox 1010, available from Ciba-Geigy, Ardsley, N.Y.

Low molecular weight polyethylene manufactured by Allied Chemicals of Morristown, N.J., and sold under marks AC-8 have been found to be satisfactory. Other low molecular weight polyethylenes are also operable. A typical polyethylene used in the instant invention had a molecular weight of about 3500. Such polyethylenes were put into solution with petrolatum by heating the mixture of a minimum of 230° F., preferably 240° F.

Glycerol hydroxy stearate is available under the trademark Loxiol G-15 from Henkel Inc., Fort Lee, N.J. It was put into solution with petrolatum using the same procedure used for polyethylene.

For the purpose of this disclosure, the term "glass" is defined as a supercooled liquid of high internal friction, i.e. an inorganic compound having ionic bonding and little or no crystalline structure, e.g. a solid solution of fused silicates of varying composition. Hollow glass microspheres manufactured by Minnesota Mining and Manufacturing Corporation and sold under the marks "3M" Brand Glass Bubbles C15/250, "3M" Brand Glass Bubbles A16/500 and "3M" Brand Glass Bubbles E22X, and "electrical grade" microballoons sold under the trademark Eccospheres SI, manufactured by Emerson & Cuming, Inc. of Canton, Mass., have been found to be satisfactory. Properties of the glass microspheres obtained from these sources are listed in Table IV. Similar types of hollow glass microspheres are also deemed to be operable.

The term "ceramic," as used in this disclosure, means crystalline inorganic particulate matter bonded together in a mass by means of either a glassy phase and/or solid state sintering. Hollow ceramic microspheres manufactured by Emerson & Cuming, Inc. of Canton, Mass., and sold under the trademark of Eccospheres FA-A have been found to be satisfactory. Properties of the ceramic microspheres obtainable from this source are listed in Table IV.

As noted in Table IV, the inorganic hollow microspheres contemplated by this invention have a particle density between 0.12 and 0.6 gms/cm$^3$. Petrolatum has a density of 0.88 gm/cm$^3$ at 20° C. In a mixture of petrolatum and microspheres, microspheres rise and float on the surface of the petrolatum when the mixture was heated up to and above its melting point. However, when 1 to 8 weight percent low molecular weight polyethylene or 1 to 15 weight percent glycerol hydroxy stearate was dissolved in petrolatum (modified petrolatum) and the microspheres were mixed in such solutions, it was observed that the "drip points" of the resultant compositions were increased considerably, in some cases up to and above 75° C. Also, the mixtures remained homogeneous and stable at all probable in-service temperatures to which filled communications cables are normally subjected.

TABLE IV

| Type of Hollow Inorganic Microspheres | Particle (Diameter) Size Range | Particle Density Range gms/cm$^3$ (Nominal) |
|---|---|---|
| Glass | | |
| Minnesota Mining and Manufacturing Corporation St. Paul, Minn. | | |
| Type 3M C15/250 | 20–200 microns | 0.12 to 0.18 (0.15) |
| Type 3M E22X | 20–200 microns | 0.19 to 0.25 (0.22) |
| Type 3M A16/500 | 20–200 microns | 0.14 to 0.18 (0.16) |
| Emerson & Cuming, Inc. Canton, Mass. | | |
| Eccospheres SI Grade | 44–175 microns | (0.25) |
| Ceramic | | |
| Emerson & Cuming, Inc. Canton, Mass. | | |
| Eccospheres FA-A | 60–325 microns | (0.6) |

The term "drip point," as used in this disclosure, means that maximum or near maximum temperature at which a part of the composition, or any component thereof (usually oil), will not separate and flow from a cable or conductors of the cable when hung, open-ended, in a vertical position for 24 hours.

The entrapped air in the hollow microspheres reduces the overall composite capacitance and thus reduces dielectric constant values of the cable filling compositions of this invention. It was experimentally established that the low density hollow glass microspheres were more effective in reducing dielectric constant values of the mixtures than the relatively heavier hollow ceramic microspheres. Use of the filling compositions of the instant invention with low dielectric values make it possible to reduce electrical insulation thickness without deleterious effects on the transmission properties and thus achieve significant savings in material costs of manufacturing electrical communications cables.

The composite densities of Examples 1–27 are considerably lower, especially of those compositions having 15 percent by weight or more microspheres, than that of petrolatum per se. This reduced density permits a longer cable to be filled with a given weight of the filling material. The resulting cable is lighter per unit length than a comparable petrolatum filled cable. Overall reduction in the amount of petrolatum in a given length of cable has another beneficial effect, viz. less oil is free to deteriorate electrical insulation in the case of electrical communications cables or to cause transmission loss in optical waveguide cables. Moreover, at higher loadings of the microspheres in the filling compositions, large surface areas of the microspheres provide sites for oil absorption and thus further reduce the amount of oil that can have deleterious effects on the cable properties.

Relatively low temperatures can be employed in the filling of communications cables using the disclosed mixtures. This results in less shrinkage of the filled compositions when cooled to room temperature.

In the disclosed compositions, especially those compositions having 15 percent by weight or more microspheres, the hollow microspheres occupy a considerable volume (almost 50 percent). They change very little in volume on cooling compared to petrolatum or modified petrolatum per se, thereby reducing the relative volume change of the filler material when compared to that petrolatum, modified or not.

BRIEF DESCRIPTION OF THE DRAWINGS

FIG. 1 is a cut-away view of a communications cable, made in accordance with the invention, illustrating various components of the cable design.

FIG. 2 is an exploded view of the insulated electrical conductors of FIG. 1, revealing interstices filled with the composition of this invention.

FIG. 3 is a cross-section of the cable of FIG. 1, made according to the instant invention, showing a plurality of insulated conductors and the interstices filled with the filling composition.

FIG. 4 is an isometric illustration of a cable having a plurality of conductors with spaces therebetween filled with the cable filler material of the invention.

FIG. 5 is a cross-section of an inorganic hollow microsphere shown in FIGS. 1-3.

DESCRIPTION OF THE PREFERRED EMBODIMENTS

Examples 1 to 7 (Table I) of the first group represent mixtures of 40 to 99 weight percent petrolatum and 1 to 60 weight percent inorganic hollow microspheres. Examples 8 to 16 (Table II) of the second group, first embodiment, represent mixtures of 1 to 8 weight percent low molecular weight polyethylene dissolved in 62 to 95 weight percent petrolatum and 1 to 35 weight percent inorganic hollow microspheres. Examples 17 to 27 (Table III) of the second group, second embodiment, represent mixtures of 1 to 15 weight percent glycerol hydroxy stearate thoroughly blended into 60 to 98 weight percent petrolatum to which 1 to 39 weight percent inorganic hollow microspheres are added and mixed. Within these disclosed ranges, the preferred embodiments and best mode known to applicants are as follows:

| | WEIGHT PERCENT |
|---|---|
| PREFERRED EMBODIMENT - FIRST GROUP | |
| INGREDIENTS | |
| (A) Petrolatum | 85 |
| Hollow glass microspheres - | |
| Particle size from .12 to .25 gms/cm$^3$ | |
| and diameters from 20 to 200 microns | 15 |
| (B) Petrolatum | 65 |
| Hollow ceramic microspheres - | |
| Nominal particle density of .6 gms/cm$^3$ | |
| and diameters from 60 to 325 microns | 35 |
| PREFERRED EMBODIMENT - SECOND GROUP | |
| INGREDIENTS, FIRST EMBODIMENT | |
| (A) Petrolatum | 82 |
| Hollow glass microspheres - | |
| Particle size from .12 to .25 gms/cm$^3$ | |
| and diameters from 20 to 200 microns | 15 |
| Low molecular weight polyethylene | |
| dissolved in the petrolatum | 3 |
| (B) Petrolatum | 62 |
| Hollow ceramic microspheres - | |
| Nominal particle density of .6 gms/cm$^3$ | |
| and diameters from 60 to 325 microns | 35 |
| Low molecular weight polyethylene | |
| dissolved in the petrolatum | 3 |
| INGREDIENTS, SECOND EMBODIMENT | |
| (A) Petrolatum | 80 |
| Hollow glass microspheres - | |
| Particle size from .12 to .25 gms/cm$^3$ | |
| and diameters from 20 to 200 microns | 17 |
| Glycerol hydroxy stearate | |
| dissolved in petrolatum | 3 |
| (B) Petrolatum | 60 |
| Hollow ceramic microspheres - | |
| Nominal particle density of .6 gms/cm$^3$ | |
| and diameters from 60 to 325 microns | 39 |
| Glycerol hydroxy stearate | |
| dissolved in petrolatum | 1 |

The petrolatum and inorganic hollow microspheres of the first group are mixed together either in a batch or a continuous process, well-known in the art, at a temperature between 200° F. and 215° F. This temperature range is considerably lower than the temperatures generally used to mix other compositions incorporating polyolefins and other polymers. Notwithstanding the mixture temperature, the filler composition can be applied to a cable, in a manner well-known in the art and forming no part of this invention, at a temperature between 190° to 200° F. This application temperature is not only a low temperature when compared to some filler materials, but it results in fewer voids and enhances personnel safety. Low application temperatures reduce the deleterious effects high temperatures used with prior art compositions have on the insulation applied over electrical conductors.

With respect to materials of the second group, the granules or flakes of low molecular weight polyethylene or glycerol hydroxy stearate are dissolved in petrolatum and then mixed with the microspheres. The resulting composition is then cooled while stirring and stored at room temperature for future use. If it is needed for immediate application, it is cooled to a temperature between 190° to 200° F. and used in the same manner as the compositions of the first variety.

The Rual Electrification Administration of the Department of Agriculture of the U.S. Government has determined that filled telecommunications cables used by REA borrowers may not drip oil for a period of 24 hours at temperatures up to 65°±1° C. The preferred embodiment mixtures of the second group of the instant invention previously disclosed do not drip oil up to 71° C.; thereby exceeding this particular REA specification.

DESCRIPTION OF THE DRAWINGS

As indicated in FIG. 1, element 1 shows in general a telecommunications cable employed in the instant invention. Element 2 is a jacket which circumscribes a metallic shield 3 which in turn circumscribes a plastic core wrap member 4. The core, delimited by the core wrap 4, comprises a bundle of insulated conductors 5, which by their very nature form interstitial spaces 6 between the conductors. Either insulated electrical conductors or optical (light transmitting) waveguides, such as that disclosed in U.S. Pat. No. 3,884,550 and/or 3,711,262, encased in a tube-like member made of plastic like that of conventional insulation of an insulated electrical conductor can be used. See FIG. 2 of U.S. Pat. No. 3,843,568.

FIG. 2 is an exploded view of the left-hand terminal portion of the telecommunications cable of FIG. 1. It reveals interstices 6 between insulated conductors 5 filled with the filling material comprising petrolatum or modified petrolatum 7 and microspheres 8.

FIG. 3 is a cross-section of the cable of FIG. 1 showing the insulated electrical conductors 5, petrolatum or modified petrolatum as element 7, and the hollow inorganic (glass or ceramic) microspheres as element 8.

FIG. 4 shows an isometric illustration of a cable having a plurality of twisted insulated electrical conductors 5, twisted together so that they define a plurality of interstitial spaces 6, filled with petrolatum or modified petrolatum 7 and microspheres 8.

FIG. 5 is a cross-section of a typical hollow microsphere 8 of FIGS. 1-4. Element 9 denotes an air-filled core delimited by spherical shaped wall 10 made of an inorganic material such as glass or ceramic material.

Cables containing the disclosed cable filler can be fabricated by suitable techniques well-known in the art. An exemplary technique for fabricating a twisted, multi-pair communication cable includes the steps of passing a plurality of twisted pairs of insulated electrical conductors into a forming zone to produce a bundle of the conductors (a core) and subsequently passing the thus made core through a stuffing box. The stuffing box is connected to a pump by means of a conduit which serves to transmit the cable filler from the pump to the stuffing box. The cable filler is passed through the side of the stuffing box at a predetermined temperature and under sufficient pressure to force it into the interstices between the several insulated conductors. The stuffing box can be adjusted to provide a layer of the filling material around the periphery of the core of conductors. The core is passed from the stuffing box to a core wrapping machine, which longitudinally or helically applies a strip of plastic (core wrap) about the core. Subsequently, the wrapped core is passed to a forming apparatus, which longitudinally folds a strip of aluminum or other metal tape about the core wrap in a conventional manner to form a shield.

The strip of aluminum 3 (shield) has adhesive coating of copolymer of ethylene acrylic acid on both sides for the purpose of achieving a bond between the overlapped edges of the strip and/or to a subsequently applied plastic jacket. After the shield is applied, the composite thus formed is passed through a crosshead die attached to an extruder, which extrudes a layer of polyethylene around the shield to form a jacket, the heat of extrusion causing the shield to bond to the jacket. The resulting cable is cooled and then collected on a take-up reel.

While the several foregoing steps can be performed individually with interruptions between each step, it is generally preferred that the cable be fabricated on a continuous basis to avoid the necessity of using storage reels between the several steps.

Although the invention has been described in considerable detail, such detailed description is only for the purpose of illustrating specific embodiments. It is evident that variations and modifications can be made from those described without departing from the spirit and scope of the invention.

What is claimed is:

1. A composition of matter comprising a mixture of 62 to 95 weight percent petrolatum, 1 to 8 weight percent of low molecular weight polyethylene having a molecular weight up to 3500 and 1 to 35 weight percent inorganic hollow microspheres having a particle density from 0.12 to 0.6 gms/cm$^3$ and diameters up to 325 microns, said polyethylene being dissolved in said petrolatum.

2. A composition of matter as in claim 1 wherein said petrolatum is composed of a mixture of microcrystalline wax and oil, the oil content is a maximum of 15 weight percent of the petrolatum and the hollow microspheres are composed of either glass or ceramic material.

3. A composition of matter comprising a mixture of petrolatum, low molecular weight polyethylene and inorganic hollow microspheres wherein:
   (a) the inorganic hollow microspheres are 5 to 20 weight percent glass microspheres having a particle density from 0.12 to 0.25 g/cc diameters from 20 to 200 microns;
   (b) the polyethylene having a molecular weight up to 3500 and is from 1 to 8 weight percent dissolved in said petrolatum; and,
   (c) the balance being petrolatum.

4. A composition of matter as in claim 3 wherein said petrolatum is composed of a mixture of microcrystalline wax and oil, and oil content is a maximum of 15 weight percent of the petrolatum.

* * * * *